(12) United States Patent
Riddell et al.

(10) Patent No.: US 9,494,132 B2
(45) Date of Patent: Nov. 15, 2016

(54) AIRFLOW MODIFYING ASSEMBLY FOR A ROTOR BLADE OF A WIND TURBINE

(71) Applicant: General Electric Company, Schenectady, NY (US)

(72) Inventors: Scott Gabell Riddell, Greer, SC (US); Michael Christopher Booth, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 712 days.

(21) Appl. No.: 13/888,661

(22) Filed: May 7, 2013

(65) Prior Publication Data
US 2014/0334938 A1 Nov. 13, 2014

(51) Int. Cl.
*F03D 1/06* (2006.01)
*F03D 1/00* (2006.01)

(52) U.S. Cl.
CPC ............. *F03D 1/0633* (2013.01); *F03D 1/001* (2013.01); *F03D 1/0675* (2013.01); *F05B 2240/122* (2013.01); *Y02E 10/721* (2013.01); *Y10T 29/49337* (2015.01)

(58) Field of Classification Search
CPC .... F03D 1/0633; F03D 1/001; F03D 1/0675; F03D 1/0625; F03D 1/0658; F05B 2240/122; Y02E 10/721; Y10T 29/49337
USPC ....................................... 416/236 R; 403/381
See application file for complete search history.

(56) References Cited

U.S. PATENT DOCUMENTS

| | | | |
|---|---|---|---|
| 4,354,648 A | 10/1982 | Schenk et al. | |
| 6,105,904 A | 8/2000 | Lisy et al. | |
| 6,837,465 B2 | 1/2005 | Lisy et al. | |
| 7,416,363 B2* | 8/2008 | Kozhuev | F16B 5/008 403/339 |
| 7,914,259 B2 | 3/2011 | Godsk | |
| 8,038,396 B2 | 10/2011 | Anjuri et al. | |
| 8,047,801 B2 | 11/2011 | Fang et al. | |
| 8,162,590 B2* | 4/2012 | Haag | F03D 1/0633 415/4.3 |

(Continued)

FOREIGN PATENT DOCUMENTS

| | | |
|---|---|---|
| WO | WO 00/15961 | 3/2000 |
| WO | WO 01/16482 | 3/2001 |
| WO | 2013060722 A1 | 5/2013 |

OTHER PUBLICATIONS

European Search Report issued in connection with corresponding EP Application No. 14166104.1 on Oct. 1, 2014.

*Primary Examiner* — Igor Kershteyn
*Assistant Examiner* — Aaron R Eastman
(74) *Attorney, Agent, or Firm* — Dority & Manning, P.A.

(57) ABSTRACT

A method and assembly for aligning airflow modifying elements on a rotor blade is disclosed. The airflow modifying assembly may be mounted onto a suction side surface or a pressure side surface of the rotor blade. Further, the airflow modifying assembly includes an alignment structure having a chord-wise extending face that may be fixed relative to the rotor blade at a predetermined position. The airflow modifying assembly further includes a first base having a root end, a tail end having an interconnecting profile, and a first plurality of airflow modifying elements. The root end is aligned with the chord-wise extending face such that the first base extends span-wise along the rotor blade. Additionally, the airflow modifying assembly includes at least one second base having a connector end with a complementary interconnecting profile and a plurality of airflow modifying elements, wherein the connector end is coupled to the tail end.

16 Claims, 7 Drawing Sheets

(56) References Cited

U.S. PATENT DOCUMENTS

| | | | | |
|---|---|---|---|---|
| 2008/0175711 A1* | 7/2008 | Godsk | F03D 1/0633 | 416/147 |
| 2009/0068018 A1* | 3/2009 | Corten | F03D 1/0641 | 416/223 R |
| 2011/0008174 A1* | 1/2011 | Ireland | B64C 23/06 | 416/223 R |
| 2011/0142637 A1* | 6/2011 | Riddell | F03D 1/0633 | 416/62 |
| 2011/0142665 A1* | 6/2011 | Huck | F03D 1/0633 | 416/228 |
| 2011/0142673 A1* | 6/2011 | Fang | F03D 1/0633 | 416/241 R |
| 2012/0151769 A1* | 6/2012 | Brake | F03D 1/0608 | 29/889.71 |
| 2012/0282105 A1* | 11/2012 | Grife | F03D 1/0675 | 416/228 |

* cited by examiner

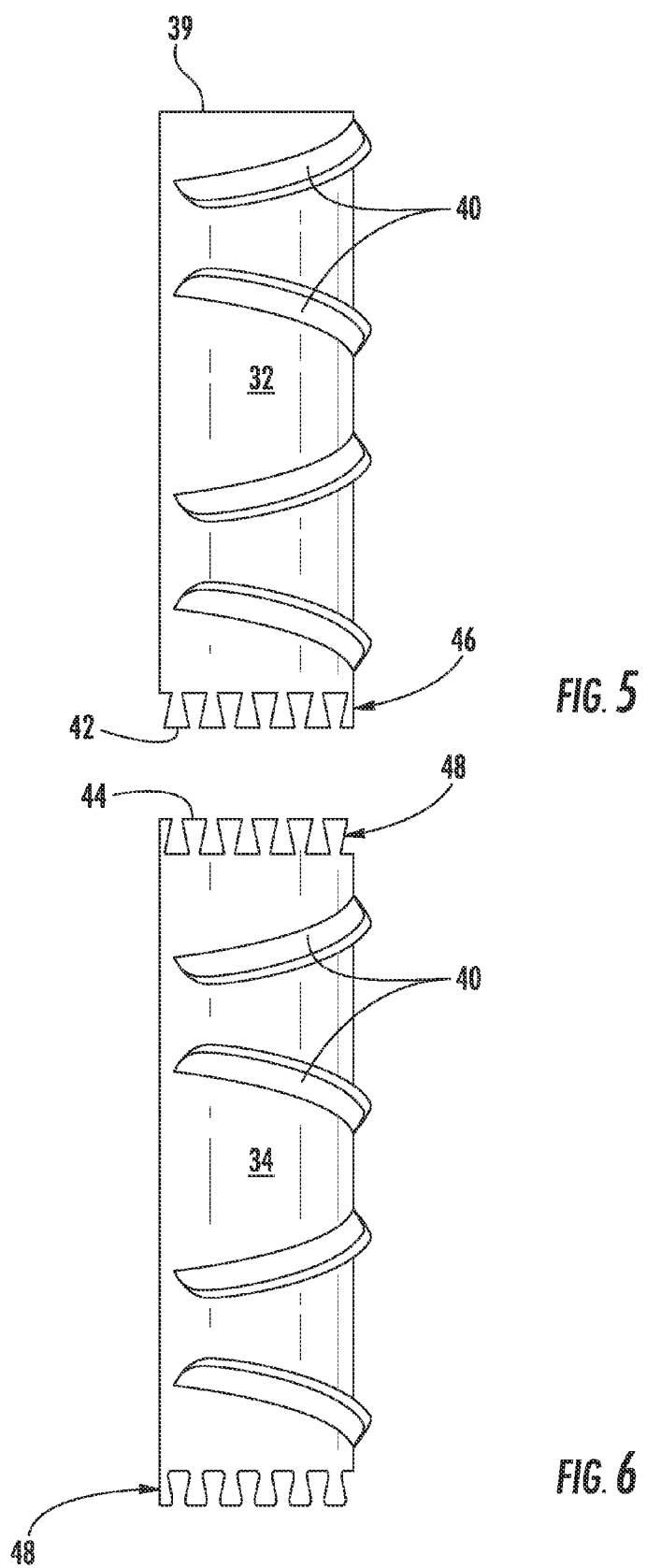

AIRFLOW MODIFYING ASSEMBLY FOR A ROTOR BLADE OF A WIND TURBINE

FIELD OF THE INVENTION

The present invention relates generally to the field of wind turbines, and more particularly to an airflow modifying assembly for a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The lift force is generated when the flow from a leading edge to a trailing edge creates a pressure difference between the top and bottom surfaces of the blade. Ideally, the flow is attached to the top surface from the leading edge to the trailing edge. However, when the angle of attack of the flow exceeds a certain critical angle, the flow does not reach the trailing edge, but leaves the surface at a flow separation line, which decreases potential energy production.

Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc). The detached-flow region also leads to an increase in drag force, mainly due to a pressure difference between the upstream attached-flow region and the downstream detached-flow region. Flow separation tends to be more prevalent near the blade root due to the relatively great angle of attack of the blade flow surfaces in this region as compared to the blade tip.

Hence, in order to increase the energy conversion efficiency during normal operation of the wind turbine, it is desired to increase the lift force of the blades while decreasing the drag force. To this purpose, it is advantageous to increase the attached-flow region and to reduce the detached-flow region by moving flow separation nearer the trailing edge of the blade. It is known in the art to change the aerodynamic characteristics of wind turbine blades by adding dimples, protrusions, or other structures on the surface of the blade. These structures are often referred to as "vortex generators" and serve to create local regions of turbulent airflow over the surface of the blade as a means to prolong flow separation and thus optimize aerodynamic airflow around the blade contour. Such vortex generators, dimples, protrusions, and other similar features on the surface of the blade may be generally referred to herein as "airflow modifying elements."

Conventional vortex generators typically consist of a base having one or more raised surfaces and are attached to the suction side of the blade using adhesive tape. It is important to properly align these airflow modifying elements in order to obtain the desired air flow characteristics, therefore, installation accounts for much of the time and cost associated with these features. For example, various systems may utilize cumbersome templates arranged on the surface of the rotor blade, which may take hours to install. Such systems may limit production to approximately two blades per day.

Accordingly, the industry would benefit from an improved method and assembly for aligning airflow modifying elements on the surface of a rotor blade. More specifically, a method and assembly that decreases installation time and cost would be advantageous.

BRIEF DESCRIPTION OF THE INVENTION

Aspects and advantages of the invention will be set forth in part in the following description, or may be obvious from the description, or may be learned through practice of the invention.

In accordance with aspects of the invention, a rotor blade for a wind turbine having an airflow modifying assembly is disclosed. The rotor blade has a suction side surface, a pressure side surface, a blade root, and a blade tip. The airflow modifying assembly may be mounted onto at least one of the suction side surface or the pressure side surface. Further, the airflow modifying assembly includes an alignment structure having a chord-wise extending face that may be fixed relative to the rotor blade at a predetermined position. More specifically, the alignment structure may be fixed substantially adjacent to the blade root. In further embodiments, the alignment structure may be one of a root flange, a pitch bearing, a root band, or similar.

Further, the airflow modifying assembly includes a first base having a root end, a tail end having an interconnecting profile, and a plurality of airflow modifying elements configured thereon. The root end may be aligned with the chord-wise extending face of the alignment structure such that the first base extends span-wise along the rotor blade from the root end to the tail end. In another embodiment, the first base may abut against the chord-wise extending face. Additionally, the airflow modifying assembly may include at least one second base having a connector end having a complementary interconnecting profile and a plurality of airflow modifying elements configured thereon. As such, the connector end of the second base may be coupled to the tail end of the first base such that the airflow modifying elements of each base properly align. More specifically, the tail end and the connector end may include a mating dovetail configuration.

In another embodiment, the airflow modifying assembly may include a plurality of second bases. Each second base may have at least one connector end and plurality of airflow modifying elements configured thereon. As such, each connector end may be coupled to a corresponding connector end of a different second base such that the plurality of second bases are connected in series. In another embodiment, each connector end and each corresponding connector end may include a mating dovetail configuration. In still another embodiment, each dovetail configuration may be unique such that the plurality of second bases may be coupled together in a predetermined order.

In yet another embodiment, the first base and the plurality of second bases may be shaped to substantially correspond to at least one of the suction side surface or the pressure side surface. Further, the first base and the plurality of second bases may be adhered to at least one of the suction side surface or the pressure side surface with an adhesive.

The present invention also encompasses any manner of a wind turbine having a tower; a nacelle mounted atop the tower; and a rotor including a rotatable hub and at least one rotor blade having a suction side surface, a pressure side surface, a blade root, and a blade tip. An airflow modifying assembly in accordance with aspects of the invention is provided mounted onto at least one of the suction side surface or the pressure side surface of the rotor blade.

In another embodiment, the present invention encompasses a method for aligning airflow modifying elements on a rotor blade. The method may include locating an alignment structure on the rotor blade; aligning a root end of a first base having a plurality of airflow modifying elements with a chord-wise extending face of the alignment structure such that the first base extends substantially span-wise along the rotor blade from the root end to a tail end having an interconnecting profile; and, connecting a complementary interconnecting profile of a connector end of a second base having a plurality of airflow modifying elements to the interconnecting profile of the tail end.

The method may further include abutting the root end of the first base against the chord-wise extending face of the alignment structure. In still another embodiment, the method may include connecting a plurality of second bases to the first base such that each base is connected in series. As such, the first base and the plurality of second bases may be connected so as to align substantially parallel to a span-wise axis. In further embodiments, the first base and the plurality of second bases may be connected so as to maintain a chord-wise distance from a trailing edge of the rotor blade. Moreover, the interconnecting profile and the complimentary interconnecting profile may include a mating first dovetail configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 5 illustrates a detailed view of a first base of an airflow modifying assembly according to the present disclosure;

FIG. 6 illustrates a detailed view of a second base of an airflow modifying assembly according to the present disclosure;

DETAILED DESCRIPTION OF THE INVENTION

Figure 1:
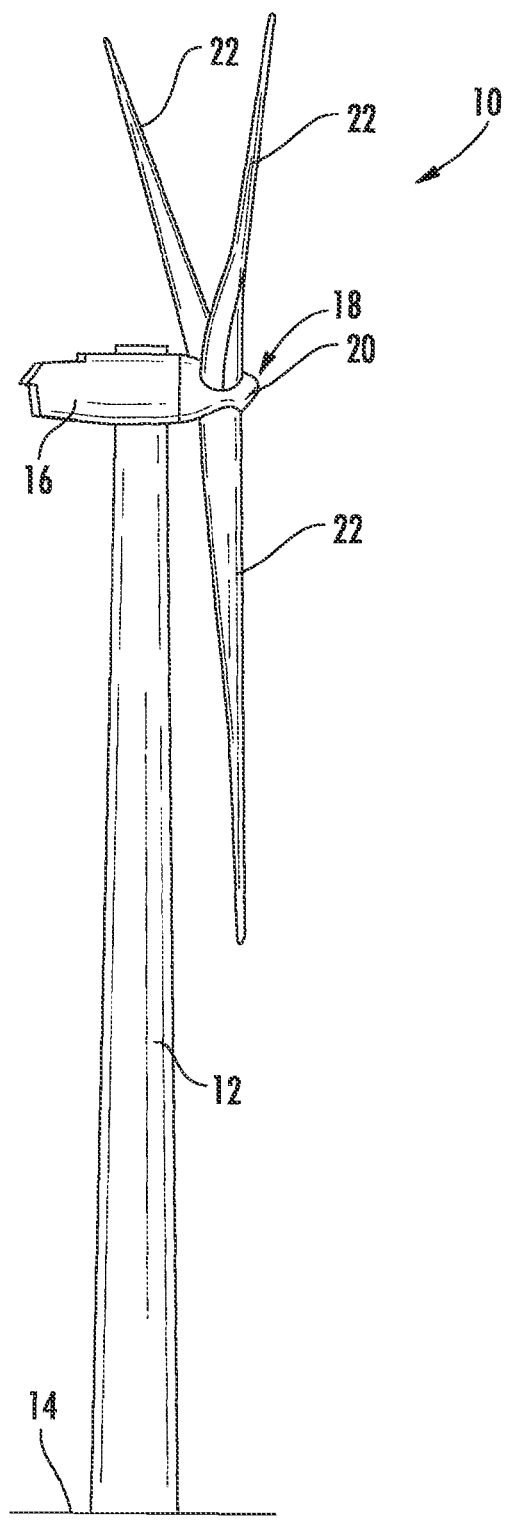
FIG. 1 illustrates a perspective view of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

The present invention is described herein as it may relate to a wind turbine blade. It should be appreciated, however, that the unique airflow modifying assembly and method in accordance with principles of the invention is not limited to use on wind turbine blades, but is applicable to any type of airfoil or flow surface that would benefit from the invention. Examples of such surfaces include airplane wings, boat hulls, sails, and so forth.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
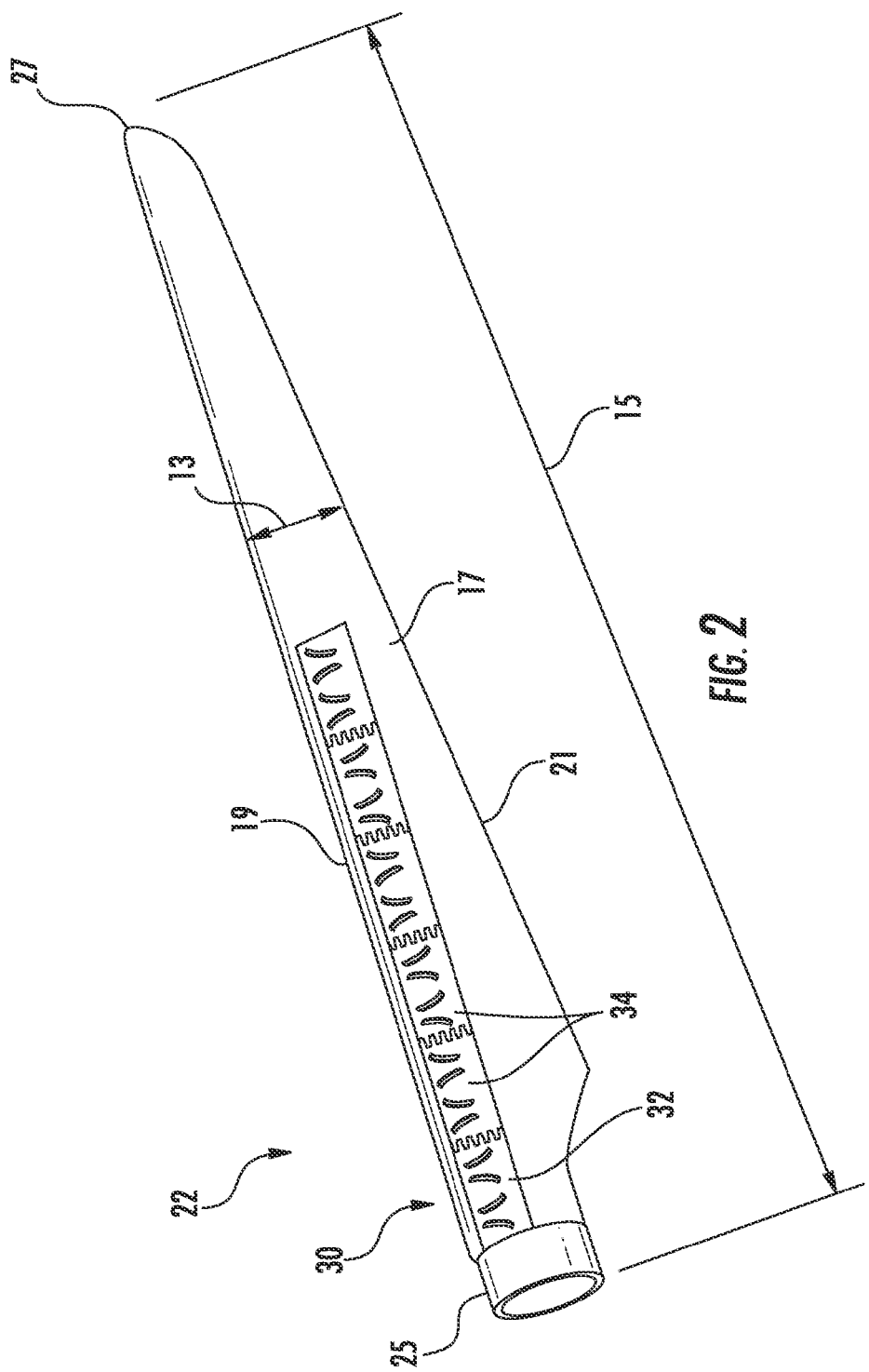
FIG. 2 illustrates a perspective view of a rotor blade including an airflow modifying assembly according to the present disclosure.

Referring now to FIG. 2, another embodiment of the rotor blade 22 for use with the wind turbine 10 is illustrated in accordance with aspects of the present subject matter. In particular, FIG. 2 illustrates a perspective view of the rotor blade 22 including one embodiment of an airflow modifying assembly 30 mounted thereon. As shown, the rotor blade 22 generally includes a blade root 25 configured to be mounted or otherwise secured to the hub 20 (FIG. 1) of the wind turbine 10 and a blade tip 27 disposed opposite the blade root 25. A body shell 17 of the rotor blade 22 generally extends between the blade root 25 and the blade tip 27. The body shell 17 may generally serve as the outer casing/covering of the rotor blade 22 and may define a substantially aerodynamic profile, such as by defining a symmetrical or cambered airfoil-shaped cross-section.

Figure 8:
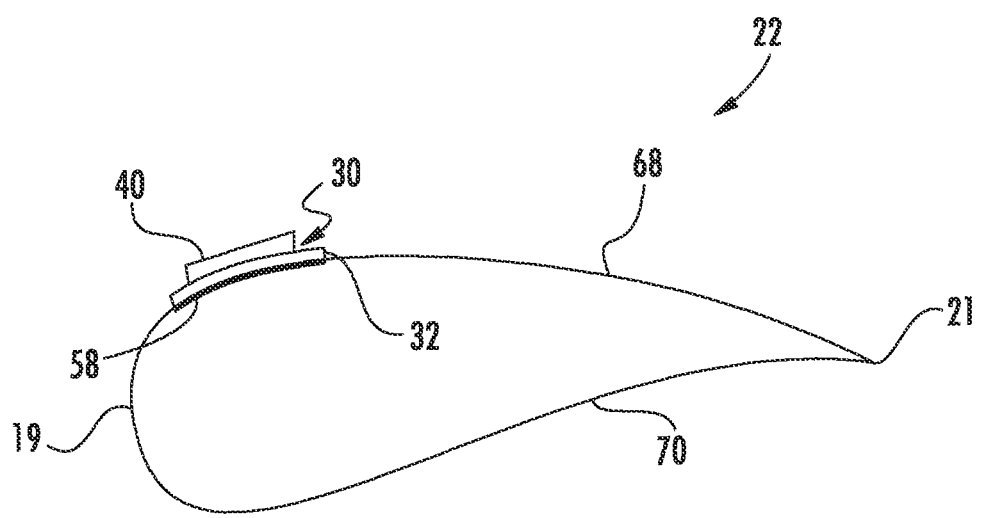
FIG. 8 illustrates a cross-section of the rotor blade including an airflow modifying assembly according to the present disclosure.

The body shell 17 may also define a pressure side surface 68 and a suction side surface 70 extending between a leading edge 19 and a trailing edge 21 of the rotor blade 22 (FIG. 8). Further, the rotor blade 22 may also have a span 15 defining the total length between the blade root 25 and the blade tip 27 and a chord 13 defining the total length between the leading edge 19 and the trailing edge 21. As is generally understood, the chord 13 may generally vary in length with respect to the span 15 as the rotor blade 22 extends from the blade root 25 to the blade tip 27. Further, "span-wise" is generally understood to mean substantially parallel to the span 15 of the rotor blade 22, whereas "chord-wise" is generally understood to mean substantially parallel the chord 13 of the rotor blade 22.

Figure 3:
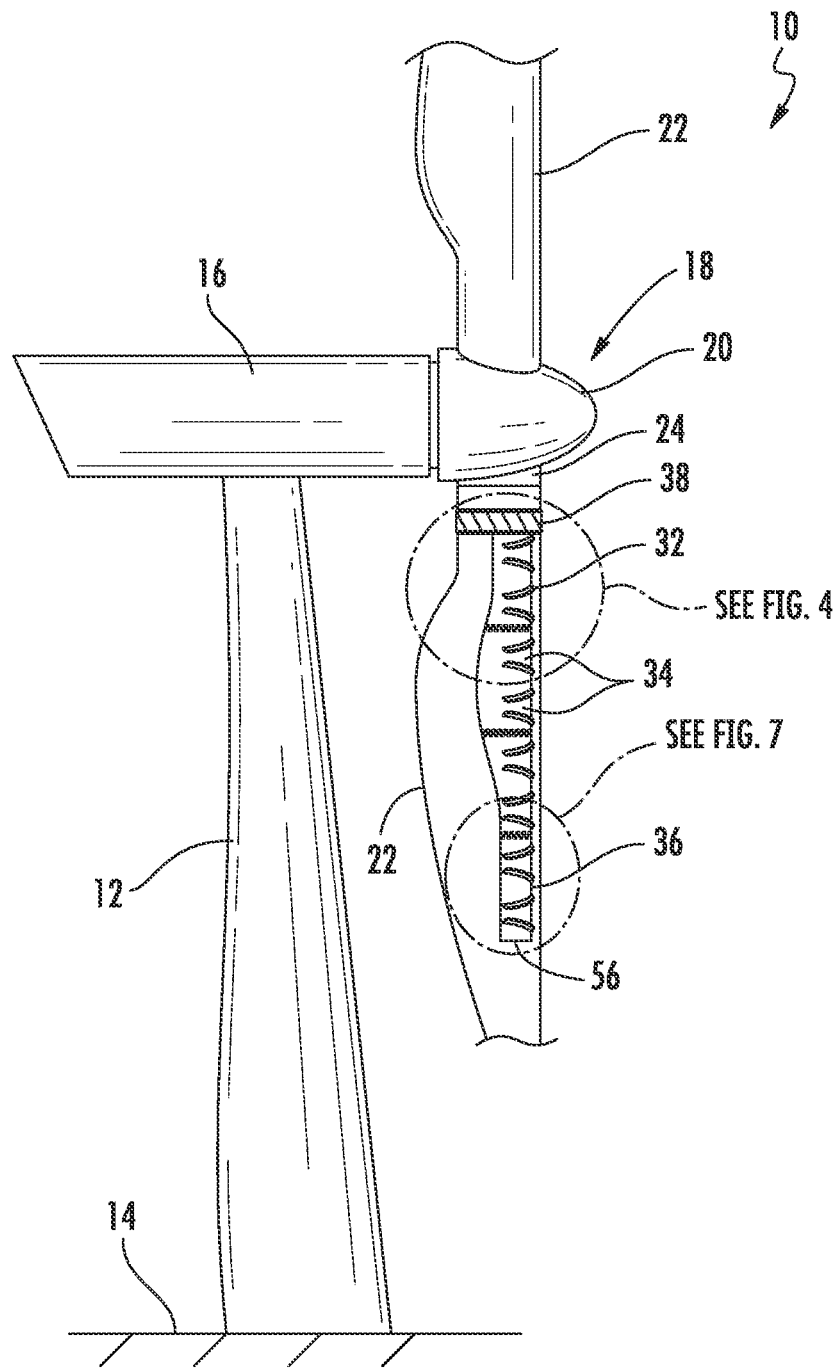
FIG. 3 illustrates a perspective view of a wind turbine including an airflow modifying assembly according to the present disclosure.
Figure 4:
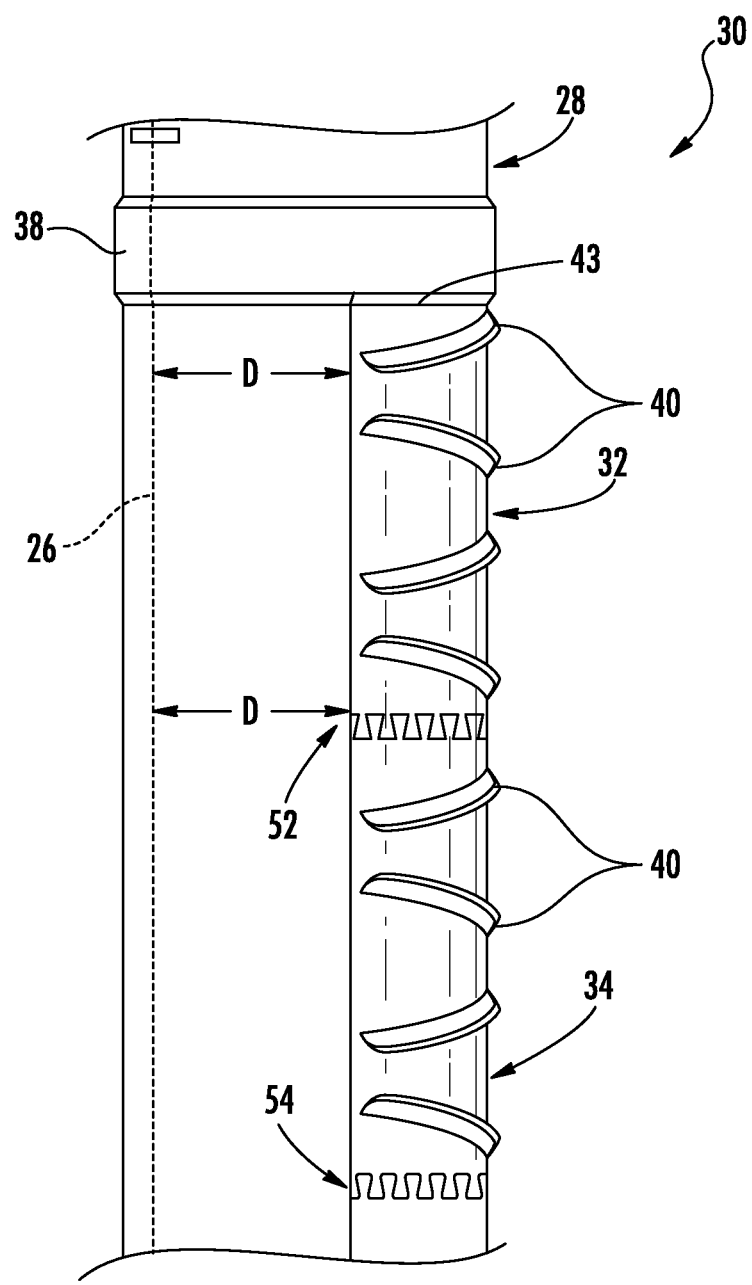
FIG. 4 illustrates a detailed view of the airflow modifying assembly of FIG. 3.

Referring now to FIG. 3, another embodiment of the rotor blade 22 including the airflow modifying assembly 30 secured to a wind turbine 10 is illustrated. FIGS. 4-7 depict more detailed views of the embodiment of FIG. 3 as indicated by the dotted lines. As illustrated, the air modifying assembly 30 may include an alignment structure 38, a first base 32, and at least one second base 34. The first base 32 has a root end 39, a tail end 46 having an interconnecting profile 42, and a plurality of airflow modifying elements 40 configured thereon. The second base 34 includes a connector end 48 having a complementary interconnecting profile 44 and a plurality of airflow modifying elements 40. As such, when the bases 32, 34 are aligned and interconnected on the surface of a rotor blade 22, the airflow modifying elements 40 of each base 32, 34 align accordingly.

More specifically, the airflow modifying assembly 30 may be quickly and easily aligned on the rotor blade 22 by aligning the root end 39 and the tail end 46 of the first base 32; and then connecting one or more second bases 34 to the tail end 46 of the first base 32 in series. For example, in one embodiment, the present invention includes a method for aligning a plurality of airflow modifying elements 40 using a fixed alignment structure 38 having a chord-wise extending face 43. As such, the method includes locating the alignment structure 38 on the rotor blade 22; aligning the root end 39 of the first base 32 with the chord-wise extending face 43 such that the first base 32 extends substantially span-wise along the rotor blade 22 from the root end 39 to the tail end 46; and, connecting at least one (or a plurality of) second base(s) 34 to the tail end 46. As such, in one embodiment, the first base 32 and the plurality of second bases 34 may be connected so as to align substantially parallel to a span-wise axis. The method may further include abutting the root end 39 of the first base 32 against the chord-wise extending face 43 of the alignment structure 38.

The tail end 46 of the first base 32 may be aligned a predetermined chord-wise distance D from a trailing edge 26 (as indicated by the dotted line in FIG. 3). As such, the first base 32 and the plurality of second bases 34 may be connected so as to maintain the predetermined chord-wise distance D from the trailing edge 26 of the rotor blade 22. Further, the predetermined chord-wise distance D may also be measured from a rotor blade edge, a blade bolt connection, a 0-degree indicator, or any other suitable reference point for aligning the tail end 46. In one embodiment, the 0-degree indicator may be a pitch line located at the root of the blade.

The first base 32 may then be secured to the rotor blade 22 using an adhesive, such as adhesive tape, or similar. Aligning the first base 32 in the manner disclosed herein sets the positioning for the second base(s) 34. As such, the second base(s) 34 may be properly aligned simply by being coupled to the first base 32. Accordingly, the corresponding airflow modifying elements 40 configured on the bases 32, 34 are properly aligned. As such, the assembly 30 and method disclosed herein may provide a significant decrease in installation time and cost.

As mentioned, the airflow modifying assembly 30 and method described herein may include one second base 34 or may include a plurality of second bases 34. As such, each second base 34 may have at least one connector end 48 and plurality of airflow modifying elements 40, wherein each connector end 48 may be coupled with a corresponding connector end 48 of a different second base 34. More specifically, each corresponding connector end 48 may include an interconnecting profile 44.

Figure 7:
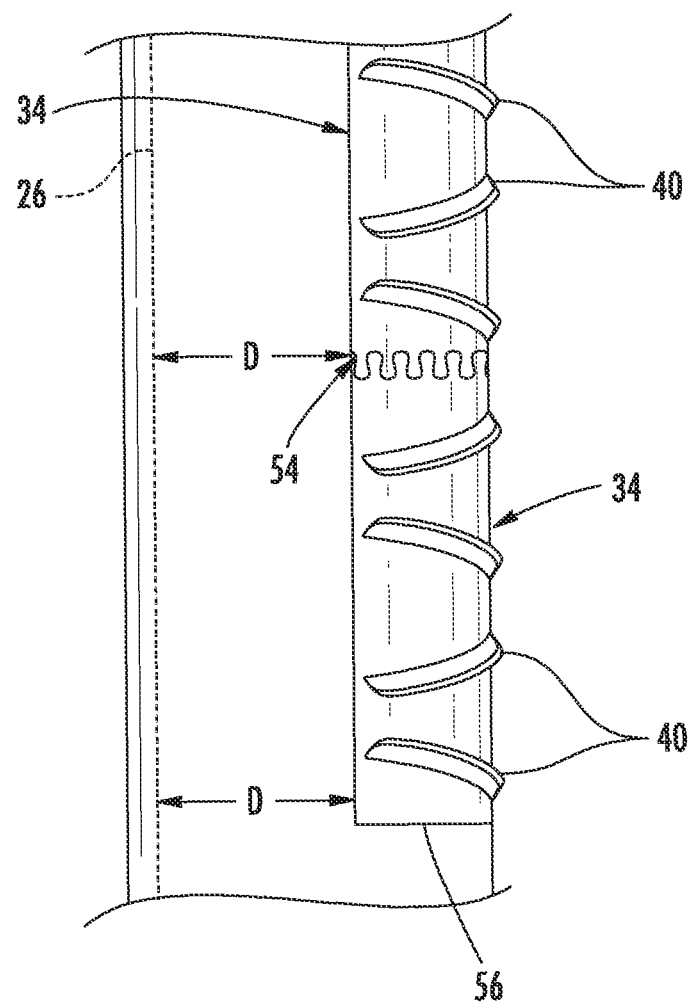
FIG. 7 illustrates another detailed view of the airflow modifying assembly of FIG. 3.

In further embodiment, the interconnecting profiles 42, 44 of the first base 32 and the second base(s) 34 may include a unique dovetail configuration 52, 54. The dovetail configurations 52, 54 may be of any appropriate shape suitable in the art. For example, in the illustrated embodiments, the dovetail configuration 52 has a square configuration, whereas the dovetail configuration 54 has a rounded configuration. In further embodiments, each dovetail configuration may be unique from each other so as to prevent improper installation (i.e. assembling the wrong end of a second base 34 or assembling a second base 34 in the wrong order). Accordingly, each connector end 48 may be connected in a predetermined order. In additional embodiments, the second bases 34 may each have similar connector ends 48 and may be distinguished using other appropriate means such as color coding or similar to prevent improper installation. Additionally, as shown in FIG. 7, the second base 34 may include a non-connector end 56 having a substantially smooth surface. The non-connector end 56 may provide better aerodynamic characteristics over the interconnecting profiles 42, 44. It should be further understood that non-connector end 56 may have any suitable configuration or shape distinct from the interconnecting profiles 42, 44 of second bases 34.

In further embodiments, each base 32, 34 may include any number of airflow modifying elements 40. For example, in the illustrated embodiments, each base 32, 34 includes four airflow modifying elements 40. However, in an alternative embodiment, each base 32, 34 may include more or less than four airflow modifying elements 40. Further, each base 32, 34 may contain a different number of airflow modifying elements 40 than any other base 32, 34. For example, in one embodiment, the first base 32 may contain two airflow modifying elements 40, whereas the second base(s) 34 may each contain three airflow modifying elements 40. Moreover, the airflow modifying elements 40 may be arranged in any suitable configuration on the bases 32, 34 so as to provide the desired aerodynamic characteristics. Additionally, the airflow modifying elements 40 described herein having any suitable shape configuration is within the scope and spirit of the invention. For example, the airflow modifying elements 40 may have a fin, wedge-type, or any other suitable shape known in the art. It should also be understood that the present invention encompasses any configuration of wind turbine 10 (FIG. 1) that includes the unique airflow modifying assembly 30 as described herein.

In still additional embodiments, the alignment structure 29 disclosed herein may include any fixed structure, whether an integral part of the rotor blade 22 or a separate structure installed onto the rotor blade 22. For example, the rotor blade 22 may be manufactured to include a raised or grooved alignment structure 38. Further, the alignment structure 29 may be located at any location on the rotor blade. For example, the alignment structure 29 may be located near the blade root 25 or may be located near the blade tip 27. More specifically, the alignment structure 29 may include a root flange 28 (FIG. 4), a root band 38 (FIG. 3), or a pitch bearing 24 (FIG. 3).

The root band 38 disclosed herein may be any suitable band or feature installed and fixed on the rotor blade 22 so as to assist with aligning the first base 32. Further, the root band 38 may be a rigid or flexible band, having any suitable shape, and may be made of any suitable material. For example, the root band 38 may be any suitable width, such as from about 100 millimeters to about 150 millimeters.

Further, the root band 38 may be a laminated, fiberglass band installed circumferentially around the chord 13 of the rotor blade 22 near the blade root 25. In another embodiment, the root band 38 may be installed circumferentially around the chord 13 of the rotor blade 22 near the blade tip 27. As such, the first base 32 may be perpendicularly abutted against the root band 38 such that the first base 32 extends in a span-wise direction from the root end 39 to the tail end 46.

Referring now to FIG. 8, an aerodynamic cross-section of rotor blade 22 is illustrated. As mentioned, the airflow modifying assembly 30 may be located at any location on either or both of the rotor blade's flow surfaces 68, 70, wherein it is desired to modify the aerodynamic characteristics of the surface. For example, as illustrated, the assembly 30 is installed on suction side surface 68 of rotor blade 22. In another embodiment, the assembly 30 may also be provided on the pressure side surface 70. Further, as illustrated, the assembly 30 may be shaped to substantially correspond to a surface of the rotor blade 22. As such, the first base 32 may be easily adhered to the surface of the rotor blade 22 with an adhesive 58. The adhesive 58 may be any adhesive tape, glue, or any other suitable adhesive known in the art.

It should be understood that the assembly 30 may be disposed closer to the blade root 25 as compared to the blade tip 27 (FIG. 3). Such a configuration provides increased lift with little additional drag (particularly desirable in low wind speed conditions). In other embodiments, the assembly 30 may be installed closer to the blade tip 27 as compared to the blade root 25. For example, conventional wedge or fin-type airflow modifying elements may be provided at the higher speed regions of the blade closer to the blade tip 27.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. As mentioned, it should also be appreciated that the invention is applicable to any type of flow surface, and is not limited to a wind turbine blade. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade for a wind turbine, said rotor blade comprising:
    a suction side surface and a pressure side surface;
    a blade root and a blade tip; and
    an airflow modifying assembly mounted onto at least one of said suction side surface or pressure side surface, said assembly comprising:
    an alignment structure fixed substantially adjacent to said blade root and installed circumferentially around a chord of the rotor blade, said alignment structure comprising a chord-wise extending face;
    a first base comprising a root end, a tail end having an interconnecting profile, and a plurality of airflow modifying elements configured thereon, wherein said root end of said first base is aligned with and abuts against said chord-wise extending face of said alignment structure such that said first base extends span-wise along the rotor blade from said root end to said tail end; and,
    at least one second base comprising a connector end having a complementary interconnecting profile and a plurality of airflow modifying elements, wherein said connector end is coupled to said tail end.

2. The rotor blade as in claim 1, wherein said tail end and said connector end comprise a mating first dovetail configuration.

3. The rotor blade as in claim 1, further comprising a plurality of second bases, each second base having at least one connector end and a plurality of airflow modifying elements, wherein each connector end is coupled with a corresponding connector end of a different second base.

4. The rotor blade as in claim 3, wherein each connector end and each corresponding connector end comprise a mating second dovetail configuration.

5. The rotor blade as in claim 4, wherein each dovetail configuration is unique such that said plurality of second bases are coupled together in a predetermined order.

6. The rotor blade as in claim 3, wherein said first base and said plurality of second bases are shaped to substantially correspond to at least one of said suction side surface or pressure side surface, and wherein said first base and said plurality of second bases are adhered to at least one of the suction side surface or the pressure side surface with an adhesive.

7. The rotor blade as in claim 1, wherein said alignment structure is one of a root flange, a pitch bearing, or a root band.

8. A wind turbine, comprising:
    a tower;
    a nacelle mounted atop said tower;
    a rotor having a rotatable hub and at least one rotor blade, said rotor blade having a suction side surface and a pressure side surface; and a blade root and a blade tip; and
    an airflow modifying assembly mounted onto at least one of said suction side surface or pressure side surface, said assembly comprising:
    an alignment structure comprising a chord-wise extending face, wherein said alignment structure is fixed substantially adjacent to said blade root and installed circumferentially around a chord of the rotor blade at a predetermined position;
    a first base comprising a root end, a tail end having an interconnecting profile, and a plurality of airflow modifying elements configured thereon, wherein said root end of said first base is aligned with and abuts against said chord-wise extending face of said alignment structure such that said first base extends span-wise along the rotor blade from said root end to said tail end; and
    at least one second base comprising a connector end having a complementary interconnecting profile and a plurality of airflow modifying elements, wherein said connector end is coupled to said tail end.

9. The wind turbine as in claim 8, wherein said tail end and said connector end comprise a mating dovetail configuration.

10. The wind turbine as in claim 8, further comprising a plurality of second bases, each second base having at least one connector end, wherein each connector end is coupled with a corresponding connector end of a different second base, and wherein each connector end and each corresponding connector end comprise a mating dovetail configuration.

11. The wind turbine as in claim 10, wherein each dovetail configuration is unique such that said plurality of second bases are coupled together in a predetermined order.

12. A method for aligning airflow modifying elements on a rotor blade, said method comprising:

locating an alignment structure on the rotor blade, the alignment structure being fixed substantially adjacent to a blade root of the rotor blade and installed circumferentially around a chord of the rotor blade;

aligning and abutting a root end of a first base having a plurality of airflow modifying elements against a chord-wise extending face of the alignment structure such that the first base extends substantially span-wise along the rotor blade from the root end to a tail end having an interconnecting profile; and, connecting a complementary interconnecting profile of a second base having a plurality of airflow modifying elements to the interconnecting profile of the tail end.

13. The method as in claim 12, wherein the interconnecting profile and the complimentary interconnecting profile comprise a mating first dovetail configuration.

14. The method as in claim 12, further comprising connecting a plurality of second bases to the first base.

15. The method as in claim 14, wherein the first base and the plurality of second bases are connected so as to align substantially parallel to a span-wise axis.

16. The method as in claim 14, wherein the first base and the plurality of second bases are connected so as to maintain a chord-wise distance from a trailing edge of the rotor blade.

* * * * *